US009666958B2

(12) United States Patent
Harwath

(10) Patent No.: US 9,666,958 B2
(45) Date of Patent: May 30, 2017

(54) CAPACITIVELY COUPLED CONNECTOR JUNCTIONS HAVING PARALLEL SIGNAL PATHS AND RELATED CONNECTORS AND METHODS

(71) Applicant: CommScope Technologies LLC, Hickory, NC (US)

(72) Inventor: Frank A. Harwath, Naperville, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/870,223

(22) Filed: Sep. 30, 2015

(65) Prior Publication Data

US 2016/0164197 A1    Jun. 9, 2016

Related U.S. Application Data

(60) Provisional application No. 62/088,798, filed on Dec. 8, 2014.

(51) Int. Cl.
*H01R 9/05* (2006.01)
*H01P 5/02* (2006.01)
*H04B 5/00* (2006.01)

(52) U.S. Cl.
CPC ........... *H01R 9/0503* (2013.01); *H01P 5/026* (2013.01); *H04B 5/0012* (2013.01)

(58) Field of Classification Search
CPC ......... H01R 9/05; H01R 9/0503; H01P 5/026; H04B 5/0012
USPC ....................................................... 439/578
See application file for complete search history.

(56) References Cited

U.S. PATENT DOCUMENTS

| 5,120,705 | A | 6/1992 | Davidson et al. |
| 5,768,084 | A | 6/1998 | Chaudhry et al. |
| 7,123,463 | B2 * | 10/2006 | Devine, Jr. ............... H01T 4/08 361/119 |
| 7,623,332 | B2 | 11/2009 | Frank et al. |
| 2004/0042149 | A1 | 3/2004 | Devine et al. |
| 2008/0170346 | A1 | 7/2008 | Van Swearingen |
| 2014/0134863 | A1 | 5/2014 | Van Swearingen et al. |
| 2014/0370747 | A1 | 12/2014 | Vaccaro et al. |
| 2015/0118897 | A1 | 4/2015 | Paynter et al. |

FOREIGN PATENT DOCUMENTS

WO    WO 2015/126675 A1    8/2015

OTHER PUBLICATIONS

International Search Report and Written Opinion Corresponding to International Application No. PCT/US2015/053392; Date of Mailing: Jan. 13, 2016; 14 Pages.

* cited by examiner

*Primary Examiner* — Khiem Nguyen
(74) *Attorney, Agent, or Firm* — Myers Bigel, P.A.

(57) ABSTRACT

Coaxial connector junctions include a first coaxial connector that has a first center conductor extension and a first outer conductor extension and a second coaxial connector that is mated with the first coaxial connector, the second coaxial connector including a second center conductor extension and a second outer conductor extension. A communications path between the first outer conductor extension and the second outer conductor extension includes a first capacitively coupled outer conductor communications path and a second galvanically coupled outer conductor communications path.

19 Claims, 5 Drawing Sheets

CAPACITIVELY COUPLED CONNECTOR JUNCTIONS HAVING PARALLEL SIGNAL PATHS AND RELATED CONNECTORS AND METHODS

CROSS-REFERENCE TO RELATED APPLICATION

The present application claims priority under 35 U.S.C. §119 to U.S. Provisional Patent Application Ser. No. 62/088,798, filed Dec. 8, 2014, the entire content of which is incorporated herein by reference as if set forth in its entirety.

FIELD OF THE INVENTION

The present invention is directed generally to connectors and, more particularly, to connectors for electrical cables.

BACKGROUND

Coaxial cables are a known type of electrical cable that may be used to carry radio frequency ("RF") signals. Coaxial cables are widely used in cable television networks, cellular communications systems and other high bandwidth applications as signals may experience less attenuation when transmitted over coaxial cable than various other types of electrical cables at the high frequencies used in such applications. FIG. 1 is a schematic perspective view of a conventional coaxial cable 10 that has been partially cut apart to reveal its internal structure. As shown in FIG. 1, the coaxial cable 10 has a center conductor 12 that is surrounded by a dielectric spacer 14. An outer conductor 16 surrounds the center conductor 12 and the dielectric spacer 14. The outer conductor 16 is typically grounded and serves as an electrical shield that reduces signal radiation (and hence signal attenuation) of the RF signal carried on the center conductor 12. Finally, a cable jacket 18 surrounds the outer conductor 16 to complete the coaxial cable 10.

A coaxial connector refers to a connector that may be attached to an end of a coaxial cable to "terminate" the coaxial cable so that the cable may be attached to an apparatus or the connector of another terminated coaxial cable. By terminating a first coaxial cable with a coaxial connector, the coaxial cable may be connected to, and subsequently disconnected from, (a) a second coaxial cable that is terminated with a "mating" coaxial connector (i.e., a coaxial connector that is designed to interface with the coaxial connector on the first coaxial cable) and (b) an apparatus that includes a mating coaxial connector. Two coaxial connectors that are connected together ("mated") are referred to herein as a "coaxial connector junction."

In a typical arrangement where a coaxial connector junction is used to connect a first coaxial cable to a second coaxial cable (or, alternatively, to an apparatus), a first coaxial connector is terminated onto the first coaxial cable and a second coaxial connector is terminated onto the second coaxial cable. The first coaxial connector may include a center conductor extension (often in the form of a pin or a post) that is connected to the center conductor of the first coaxial cable and an outer conductor extension (typically in the form of a connector body) that is connected to the outer conductor of the first coaxial cable. The second coaxial connector may also include a center conductor extension (often in the form of a sleeve or a contact spring) that is connected to the center conductor of the second coaxial cable and an outer conductor extension (typically in the form of a connector body) that is connected to the outer conductor of the second coaxial cable. The center conductor extension of the first coaxial connector is mated with the center conductor extension of the second coaxial connector, and the outer conductor extension of the first coaxial connector is mated with the outer conductor extension of the second coaxial connector. The first coaxial connector typically includes a threaded coupling nut and the second coaxial connector typically includes a threaded surface (or vice versa). By threading the coupling nut of the first coaxial connector onto the threaded surface of the second coaxial connector the two coaxial connectors may be drawn together into secure electro-mechanical engagement. When the first and second coaxial connectors are mated together, the coaxial connector junction is formed that electrically connects the center conductor of the first coaxial cable to the center conductor of the second coaxial cable, and that electrically connects the outer conductor of the first coaxial cable to the outer conductor of the second coaxial cable.

Passive Intermodulation Distortion (PIM) is a form of electrical interference/signal transmission degradation that may occur at interconnections, such as interconnections between two coaxial connectors, where a non-linearity is introduced into the connection, either as initially installed or due to electro-mechanical shift over time. Interconnections may shift due to mechanical stress, vibration, thermal cycling, and/or material degradation. PIM can be an important interconnection quality characteristic, as PIM generated by a single low quality interconnection may degrade the electrical performance of an entire RF system. Thus, the reduction of PIM via connector design is typically desirable. One method of reducing PIM is to use coaxial connector junctions that employ capacitive interconnections rather than galvanic interconnections.

SUMMARY

Pursuant to embodiments of the present invention, coaxial connector junctions are provided that include a first coaxial connector that has a first center conductor extension and a first outer conductor extension. A second coaxial connector is mated with the first coaxial connector. The second coaxial connector includes a second center conductor extension and a second outer conductor extension. A communications path between the first outer conductor extension and the second outer conductor extension includes a first capacitively coupled outer conductor communications path and a second galvanically coupled outer conductor communications path.

In some embodiments, the first capacitively coupled outer conductor communications path may be configured to substantially pass signals having frequencies in a first frequency range while substantially blocking signals having frequencies in a second frequency range that encompasses frequencies that are lower than the first frequency range, and the second galvanically coupled outer conductor communications path may be configured to substantially pass signals having frequencies in the second frequency range while substantially blocking signals in the first frequency range.

In some embodiments, a communications path between the first center conductor extension and the second center conductor extension may include a first capacitively coupled center conductor communications path and a second galvanically coupled center conductor communications path. In such embodiments, the first capacitively coupled center conductor communications path may be configured to substantially pass signals having frequencies in a first frequency range while substantially blocking signals having frequencies in a second frequency range that encompasses frequencies that are lower than the first frequency range, and the second galvanically coupled center conductor communications path may be configured to substantially pass signals having frequencies in the second frequency range while substantially blocking signals in the first frequency range.

In some embodiments, the first center conductor extension may include an outer shell that defines an internal cavity, and the first capacitively coupled center conductor communications path may extend along the outer shell and the second galvanically coupled center conductor communications path may extend through the internal cavity. In such embodiments, the second galvanically coupled center conductor communications path may include an inductance that is at least partly within the internal cavity.

In some embodiments, the first outer conductor extension may include an outer shell that defines an internal cavity, and the first capacitively coupled outer conductor communications path may extend along the outer shell and the second galvanically coupled outer conductor communications path may extend through the internal cavity. In such embodiments, the second galvanically coupled outer conductor communications path may include an inductance.

In some embodiments, the first outer conductor extension may be spaced apart from and circumferentially surround the first center conductor extension and the second outer conductor extension may be spaced apart from and circumferentially surround the second center conductor extension.

In some embodiments, the first capacitively coupled outer conductor communications path and the second galvanically coupled outer conductor communications path may comprise parallel paths that are configured to carry signals in different frequency ranges.

Pursuant to further embodiments of the present invention, methods of reducing corrosion in a connector junction between a first electrical connector and a second electrical connector are provided in which a first capacitively coupled communications path is provided between a first conductor of the first connector and a first conductor of the second connector. A second galvanically coupled communications path is provided between the first conductor of the first connector and the first conductor of the second connector. The second galvanically coupled communications path is electrically parallel to the first capacitively coupled communications path and is configured to maintain the first conductor of the first connector and the first conductor of the second connector at the same electrical potential.

In some embodiments, the first electrical connector may be a first coaxial connector and the second electrical connector may be a second coaxial connector, and the first conductor of the first coaxial connector may be an outer conductor of the first coaxial connector and the first conductor of the second coaxial connector may be an outer conductor of the second coaxial connector.

In some embodiments, the first electrical connector is a first coaxial connector and the second electrical connector is a second coaxial connector, and the method may further involve providing a second capacitively coupled communications path between a second conductor of the first coaxial connector and a second conductor of the second coaxial connector and providing a second galvanically coupled communications path between the second conductor of the first coaxial connector and the second conductor of the second coaxial connector. In such embodiments, the second galvanically coupled communications path may be electrically parallel to the second capacitively coupled communications path and may be configured to maintain the second conductor of the first coaxial connector and the second conductor of the second coaxial connector at the same electrical potential.

In some embodiments, the first capacitively coupled communications path between the first conductor of the first connector and the first conductor of the second connector may only pass signals above a first frequency while the second galvanically coupled communications path between the first conductor of the first connector and the first conductor of the second connector may only pass signals below the first frequency.

Pursuant to still further embodiments of the present invention, methods of transmitting multiple signals through a coaxial connector junction formed between a first coaxial connector and a second coaxial connector are provided. Pursuant to these methods, a first radio frequency signal is capacitively coupled from the first coaxial connector to the second coaxial connector and a second low frequency signal is galvanically coupled from the first coaxial connector to the second coaxial connector.

In some embodiments, the second low frequency signal may be a direct current power supply signal. In other embodiments, the second low frequency signal may be a control signal having a center frequency of less than 1 MHz.

In some embodiments, the coaxial connector junction may be a center conductor communications path between a center conductor extension of the first coaxial connector and a center conductor extension of the second coaxial connector and an outer conductor communications path between an outer conductor extension of the first coaxial connector and an outer conductor extension of the second coaxial connector, and the outer conductor communications path may be a first capacitively coupled outer conductor communications path and a second galvanically coupled outer conductor communications path.

In some embodiments, the first outer conductor extension may include an outer shell that defines an internal cavity, and the first capacitively coupled outer conductor communications path may run along the outer shell.

In some embodiments, the second galvanically coupled outer conductor communications path may include a low pass filter.

In some embodiments, the first center conductor extension may include an outer shell that defines an internal cavity, and the first capacitively coupled center conductor communications path may run along the outer shell and the second galvanically coupled center conductor communications path may run through the internal cavity. In such embodiments, the second galvanically coupled center conductor communications path may include a low pass filter.

Pursuant to still further embodiments of the present invention, coaxial connectors may be provided that include a center conductor extension that has an outer shell that defines an internal cavity and a center conductor contact that is electrically connected to the center conductor extension and disposed within the internal cavity; an outer conductor extension that is spaced apart from and circumferentially surrounding the center conductor extension; and a dielectric spacer interposed between the center conductor extension and the outer conductor extension that electrically isolates the center conductor extension from the outer conductor extension.

In some embodiments, the center conductor contact may be configured to mate with a center conductor contact of a mating coaxial connector.

In some embodiments, the center conductor contact may include a low pass filter.

In some embodiments, the coaxial connector may further include a coupling nut that is configured to releasably attach the coaxial connector to a mating coaxial connector so that the center conductor extension capacitively couples with a center conductor extension of the mating coaxial connector and the outer conductor extension capacitively couples with an outer conductor extension of the mating coaxial connector, and so that the center conductor contact galvanically mates with a mating center conductor contact of the mating coaxial connector.

In some embodiments, the center conductor extension of the mating coaxial connector may be an outer shell that defines an internal cavity, and the mating center conductor contact of the mating coaxial connector may be electrically connected to the center conductor extension of the mating coaxial connector.

Pursuant to still further embodiments of the present invention, electrical connectors are provided that include an outer conductor extension having a cable receiving end and a connection end opposite the cable receiving end; a center conductor extension having a first end that is configured to physically and electrically engage a conductor of a communications cable that is received within the cable receiving end of the outer conductor extension and a second end that comprises an outer shell that defines an internal cavity; and a center conductor contact that is within the internal cavity.

In some embodiments, the outer shell may be configured to capacitively couple with a center conductor extension of a mating electrical connector, and the center conductor contact may be configured to physically engage a center conductor contact of the mating coaxial connector to provide parallel communications paths between the electrical connector and the mating electrical connector.

In some embodiments, the center conductor contact may include a low pass filter.

In some embodiments, the outer shell may include an expanded capacitive coupling surface.

DETAILED DESCRIPTION

Figure 1:
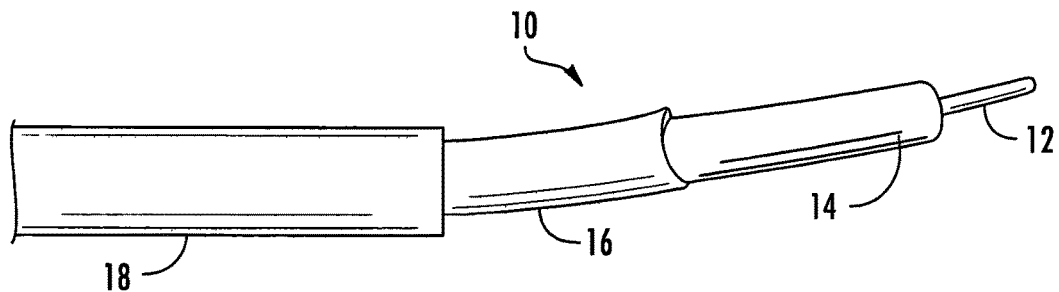
FIG. 1 is a side partially cut-away view of a conventional coaxial cable.

RF signals are transmitted over coaxial cables and connectors in a wide variety of applications. In many of these applications, it may also be necessary to transmit additional signals such as controls signals and/or alternating current ("AC") or direct current ("DC") power signals over cabling connections. By way of example, in many cellular base station applications, coaxial cables are used to carry RF signals from, for example, baseband equipment that is located at the bottom of an antenna tower (or other structure) to remote radio heads that are located at the top of the antenna tower. As the remote radio heads are powered devices, it is also typically necessary to transmit DC power up the antenna tower to power the remote radio heads. Additionally, control signals may also be transmitted up the tower to control antennas that can be mechanically or electrically steered via actuators and/or beam-forming elements. In some cases, these DC power signals and/or control signals may be simultaneously transmitted over the same coaxial cable that is used to transmit RF signals between the remote radio head and the baseband equipment.

As discussed above, coaxial connector junctions that use capacitive connections can be used at cellular base stations and in other applications to reduce PIM. Unfortunately, however, a number of problems may arise when such capacitively-coupled coaxial connector junctions are used. For example, capacitively-coupled coaxial connector junctions typically cannot pass low frequency signals or DC power as the capacitive interfaces acts as an open circuit for such signals. Accordingly, when capacitively-coupled coaxial connector junctions are used, it may be necessary to provide additional cabling and connectors to carry control signals and/or DC power signals. Additionally, it can also be more difficult to adequately ground cabling connections that employ capacitively-coupled coaxial connector junctions against lightning strikes, as the capacitively-coupled junction does not provide a low-resistance path to ground for the energy of a lightning strike. Accordingly, it may be necessary to ground every segment of a capacitively-coupled cabling connection to ensure that each segment of the connection has a low-resistance path to ground, which can be expensive and/or difficult in some applications. Moreover, in applications where capacitively-coupled connector junctions are used, an electric potential difference may result between connector elements that form the capacitive connections and, if moisture bridges this capacitive connection, then this electric potential difference may corrode portions of the coaxial connectors which can severely degrade the electrical connection between the two coaxial connectors.

Pursuant to embodiments of the present invention, coaxial connector junctions between a first coaxial connector and a second coaxial connector are provided in which the outer conductor extensions of the mated first and second coaxial connectors are configured to provide a first capacitively coupled outer conductor communications path and the center conductor extensions of the mated first and second coaxial connectors are configured to provide a first capacitively coupled center conductor communications path. In addition, the mated first and second coaxial connectors may also have a second galvanically coupled outer conductor communications path and/or a second galvanically coupled center conductor communications path. The second galvanically coupled outer conductor communications path may be disposed in parallel to the first capacitively coupled outer conductor communications path, and the second galvanically coupled center conductor communications path may be disposed in parallel to the first capacitively coupled center conductor communications path. The second galvanically coupled outer conductor communications path and the second galvanically coupled center conductor communications path may be configured to pass low frequency signals while blocking higher frequency RF signals.

In some embodiments, the second galvanically coupled center and outer conductor communications paths may be used to transmit power (e.g., DC power) and/or low frequency control signals through the coaxial connector junction in parallel with RF signals that are transmitted through the junction via the capacitively coupled center and outer conductor communications paths. In addition, the second galvanic connection through the outer conductor extensions may provide a low frequency ground path that allows the energy from lightning strikes to pass from the outer conductor extension of the first coaxial connector to the outer conductor extension of the second coaxial connector to a grounding location. The second galvanically coupled center and outer conductor communications paths may also be used to maintain the mating conductor pairs on both sides of the junction (i.e., the two outer conductor extensions or the two center conductor extensions) at the same electric potential, which may reduce the tendency for corrosion of the coaxial connectors at the capacitive junctions.

In some embodiments, a low pass filter may be included on one or both of the second galvanically coupled center conductor communications path and/or the second galvanically coupled outer conductor communications path. Thus, while the junction between the conductor extensions of the two connectors (e.g., the center conductor extensions of the two connectors) may comprise a galvanic interface, a low pass filter may be incorporated along the low frequency communications path in one (or both) of the connectors. The low pass filter may be implemented, for example, using an inductor. In some embodiments, the second galvanically coupled communications paths may pass through a center portion of the central or outer conductor extensions of the mated coaxial connectors (i.e., a portion that is within the body of the conductor extension as opposed to an outer skin thereof) so that the skin depth effect of the capacitively coupled RF communications path will further isolate the RF signals from the galvanically coupled (low frequency) communications paths. The direct galvanic connections for the low frequency paths may be implemented using conventional coaxial cable contacts that are provided in addition to the capacitive connections that form the RF signal path.

The coaxial connector junctions according to embodiments of the present invention may provide a number of advantages over prior art capacitive coaxial connector junctions. For example, the coaxial connector junctions according to embodiments of the present invention may simultaneously pass two or more of RF signals, low frequency control signals, and direct current power. This may allow all three signal types to be carried up, for example, an antenna tower on a single coaxial cable as opposed to using two or three separate cables, which may significantly reduce tower wind and weight loading, decrease cost and simplify installation. Additionally, the coaxial connector junctions according to embodiments of the present invention may provide improved electrical grounding for protection against lightning strikes and may also reduce connector corrosion issues that may occur due to a difference in electrical potential across capacitive interconnections.

While the coaxial connector junctions according to embodiments of the present invention may provide a number of advantages simultaneously, it will be appreciated that aspects of the present invention may be applied in many different ways. For example, in some embodiments, only the outer conductor extensions of the two mated coaxial connectors may have the low frequency galvanically coupled communications path which is used to reduce degradation of the connection due to corrosion. Thus, it will be appreciated that not all of the advantages need be simultaneously achieved.

Example embodiments of the present invention will now be discussed in further detail with reference to the drawings.

Figure 2A:
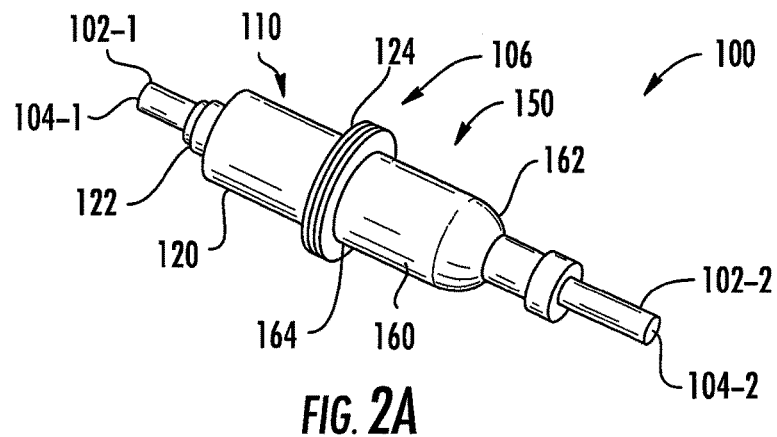
FIGS. 2A-2C are a perspective view, a perspective cross-sectional view and an exploded perspective cross-sectional view, respectively, of a connector junction according to certain embodiments of the present invention.
Figure 2B:
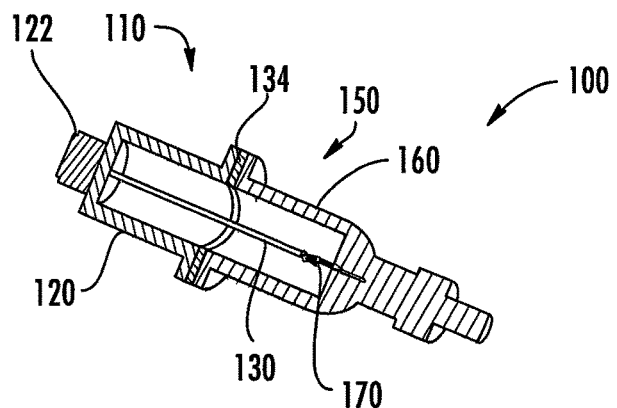
Figure 2C:
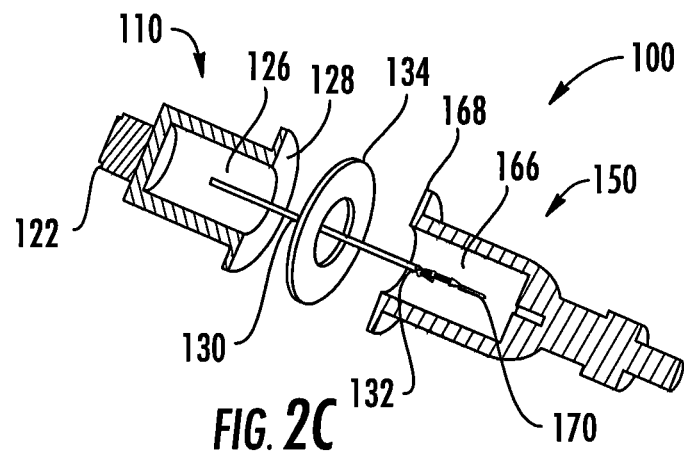
Figure 2D:
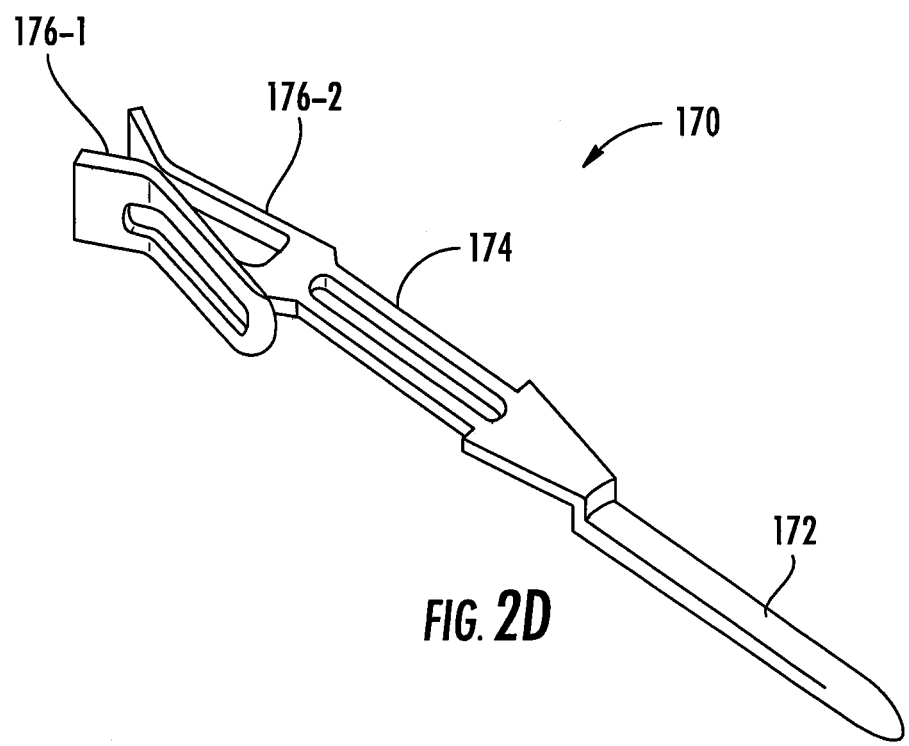
FIG. 2D is an enlarged perspective view of a spring contact that is included in one of the connectors of the connector junction of FIGS. 2A-2C.

FIGS. 2A-2C are a perspective view, a perspective cross-sectional view and an exploded perspective cross-sectional view, respectively, of an electrical connector junction 100 according to certain embodiments of the present invention. FIG. 2D is an enlarged perspective view of a spring contact 170 that is included in one of the connectors of the connector junction 100 of FIGS. 2A-2C. As shown in FIGS. 2A-2C, the electrical connector junction 100 may be formed by mating a first electrical connector 110 with a second electrical connector 150. The first electrical connector 110 may be attached to an end of a first electrical cable 102-1 and the second electrical connector 150 may be attached to an end of a second electrical cable 102-2. In FIGS. 2A-2C, the housings of the first and second electrical connectors 110, 150 are not shown to simplify the drawings and to more clearly illustrate the design and construction of the signal current path through the connectors 110, 150. It will be appreciated that any appropriate housing structures may be used and that the housings may include mating attachment structures (e.g., a threaded coupling nut on one housing and a threaded surface on the other housing) that may be used to draw the electrical connectors 110, 150 into firm electromechanical engagement.

As is shown in FIGS. 2A-2C, electrical connector 110 includes a conductor extension 120 that has a first end 122 and a second end 124. In the depicted embodiment, the conductor extension 120 is somewhat elongated along the longitudinal axis defined by the first electrical cable 102-1. The conductor extension 120 may have a generally circular shape in cross-sections taken along the longitudinal axis thereof, and the radius of these cross-sections may vary (e.g., the radius of the cross-sections may be smaller towards the first end 122 as compared to the second end 124). A conductor 104-1 of the first electrical cable 102-1 may be physically and electrically connected (e.g., by the housing of the first electrical connector 110) to the first end 122 of the conductor extension 120. The conductor extension 120 may be formed of a conductive material such as a metal (e.g., copper). As shown in FIGS. 2B and 2C, the first end 122 of the conductor extension 120 may be solid while the second end 124 may include an internal cavity 126 that has an open end. Additionally, the second end 124 of the conductor extension 120 may include a lip that forms an annular plate 128 that increases the surface area of the front surface of the second end 124 of the conductor extension 120. An annular dielectric disk 134 may be attached to the annular plate 128. As discussed below, the annular plate 128 and the annular dielectric disk 134 may form an electrode and a dielectric of a capacitor 106 that is used to capacitively couple RF signals from the first connector 110 to the second connector 150 (and vice versa).

The conductor extension 120 further includes a male contact structure in the form of a conductive post 130 that is mechanically and electrically connected to the conductor extension 120. In the depicted embodiment, the conductive post 130 comprises a metal rod that protrudes from a rear surface of the internal cavity 126 in the longitudinal direction toward connector 150. The conductive post 130 may be formed integral with the conductor extension 120 or may be formed separately and be press fit, soldered or welded, for example, into a longitudinal hole that is formed in the rear of the internal cavity 126. A distal end 132 of conductive post 130 may extend longitudinally beyond the internal cavity 126.

The electrical connector 150 may be very similar to the electrical conductor 110. For example, as shown in FIGS. 2A-2C, the electrical connector 150 includes an elongated metal conductor extension 160 that has a first end 162 and a second end 164. The conductor extension 160 has generally circular cross-sections along the longitudinal direction. A conductor 104-2 of the second electrical cable 102-2 is physically and electrically connected to the first end 162 of the conductor extension 160. The first end 162 of the conductor extension 160 is solid while the second end 164 has an internal cavity 166 that has an open end. The second end 164 of the conductor extension 160 also has a lip that forms an annular plate 168 that increases the surface area of the front surface of the second end 164 of the conductor extension 160. The annular plate 168 forms the second electrode of the capacitor 106. The open end of internal cavity 126 of connector 110 mates with the open end of internal cavity 166 of connector 150 when connectors 110 and 150 are joined to form the connector junction 100.

The conductor extension 160 further includes a female contact structure in the form of a spring contact 170 that is positioned within the internal cavity 166 and that is mechanically and electrically connected to the conductor extension 160. FIG. 2D illustrates one example embodiment of a suitable spring contact 170. The conductive spring contact 170 is configured to receive the distal end 132 of the conductive post 130 of the first electrical connector 110 when the first and second electrical connectors 110, 150 are mated together. As shown in FIG. 2D, the spring contact 170 may comprise a clasp contact that includes a termination post 172, a body 174 that extends from the termination post 172, and a pair of spring arms 176-1, 176-2 that extend from the end of the body 174 that is opposite the termination post 172. The termination post 172 may be, for example, press fit, soldered or welded into a longitudinal hole that is formed in the rear surface of the internal cavity 166. The spring arms 176 may be configured to receive the distal end 132 of conductive post 130 therebetween when the first and second connectors 110, 150 are mated together. The spring contact 170 may be formed of a resilient metal and the spring arms 176 may be separated from each other by a distance that is less than the diameter of the conductive post 130 so that the spring arms 176 will exert a contact force on the conductive post 130 when the conductive post 130 is inserted therebetween.

The connector junction 100 of FIGS. 2A-2C may operate as follows. A radio frequency signal that is incident on cable 102-1 will pass to the conductor extension 120 of the first connector 110 as the conductor 104-1 of cable 102-1 directly contacts the first end 122 of conductor extension 120. As shown in FIG. 2B, the annular plate 128 of conductor extension 120 faces the matching annular plate 168 of conductor extension 160 of connector 150 with the dielectric spacer 134 provided therebetween. These components together form a capacitor 106 (i.e., two conductive plates with a dielectric therebetween). Accordingly, a portion of the RF signal energy that passes to conductor extension 120 will capacitively couple through the capacitor 106 to the conductor extension 160 of electrical connector 150, and from there will pass to the conductor 104-2 of cable 102-2 as the conductor 104 directly contacts the conductor extension 160. Thus, an RF signal that is on the first cable 102-1 will capacitively couple to the second cable 102-2 through the mated connector junction 100 via a capacitively coupled communications path through the capacitor 106.

As discussed above, a direct galvanic communications path may also be provided between electrical connector 110 and electrical connector 150 as the conductive post 130 is directly connected to (or part of) conductor extension 120, the spring contact 170 is directly connected to (or part of) the conductor extension 160, and the conductive post 130 is received within and directly contacts the spring arms 176 of spring contact 170 when electrical connector 110 is mated with electrical connector 150. This galvanically coupled communications path is electrically disposed in parallel to the above-discussed capacitively coupled communications path.

The connector junction 100 may be designed so that the galvanically coupled communications path is configured to pass signals in a first frequency range and the capacitively coupled communications path is configured to pass signals in a second frequency range that is higher than the first frequency range. In the embodiment of FIGS. 2A-2C, a phenomena known as the skin depth effect may be used (at least in part) to route signals based on their frequency over the appropriate communications path. As is known to those of skill in the art, the skin depth effect arises because the changing magnetic field that results from the alternating current of an RF signal gives rise to opposing eddy currents in the conductors that carry the RF signal. These eddy currents cause the effective resistance of the conductor to increase at higher frequencies as a function of the distance from the outer surface of the conductor. As a result, at higher frequencies, most of the current will flow near the surface of the conductor and only a very small amount of the current will flow in the middle portion of the conductor.

Referring again to FIGS. 2A-2C, it can be seen that by providing the internal cavity 126 it is possible to mount the conductive post 130 to a central portion of the conductor extension 120. Likewise, the spring contact 170 is mounted within the internal cavity 166 so that it is similarly mounted to a central portion of the conductor extension 160. As such, the direct galvanic connection that is provided in connector junction 100 (which passes through the conductive post 130 and the spring contact 170) extends from a central portion of the conductor extension 120 to a central portion of the conductor extension 160. If the RF signals are at reasonably high frequencies, the vast majority of the current associated with these signals travels at or near the outer skin of conductor extensions 120, 160, and hence very little current may flow through the conductive post 130 to the spring contact 170. Consequently, the RF signals may primarily capacitively couple through the connector junction 100 and hence PIM may be reduced.

In addition to the above-described RF signal, one or more DC power supply signals or low frequency control signals may also be transmitted from the first cable 102-1 to the second cable 102-2 through the connector junction 100. As these signals are low frequency signals (and the power signal may also be a direct current signal), there may be little or no skin depth effect with respect to these signals, and hence these signals may travel through the above-described direct galvanic connection between electrical connector 110 and electrical connector 150 (i.e., from the post 132 to the spring contact 172). In light of the low resistance direct galvanic connection, very little energy from these low frequency signals will capacitively couple across the mated connectors via the capacitor 106. Thus, the connector junction 100 may capacitively couple an RF signal from the first cable 102-1 to the second cable 102-2 with little or no PIM while also allowing low frequency power signals and/or control signals to pass from cable 102-1 to cable 102-2. Thus, the connector junction 100 may be used to pass multiple types of signals, and hence may reduce the number of cables and connectors that are required in various applications.

Figure 3:
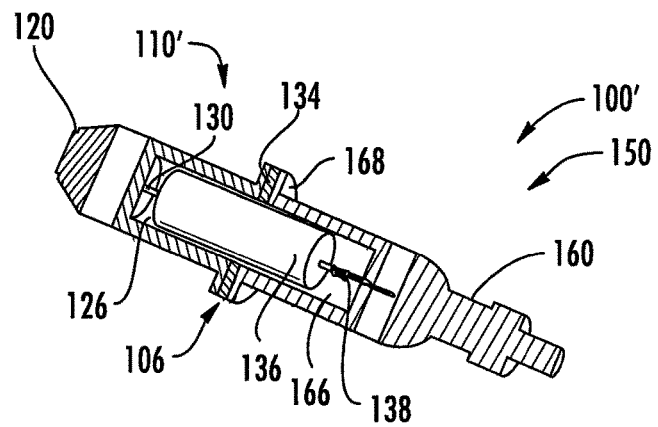
FIG. 3 is a schematic perspective cross-sectional view illustrating a connector junction according to further embodiments of the present invention.

As noted above, the skin depth effect may limit the amount of current of a high frequency RF signal that may flow through the direct galvanic connection between electrical connectors 110 and 150. However, in some applications, it may be necessary to further limit or prevent the RF signal from partially flowing through this direct galvanic connection in order to ensure that PIM is maintained at acceptably low levels. FIG. 3 is an exploded, cross-sectional view of a modified connector junction 100' in which substantially all of the RF signal current flow from connector 110 to connector 150 will pass through the capacitor 106.

Referring to FIG. 3, it can be seen that the connector junction 100' is almost identical to the connector junction 100 of FIGS. 2A-2C. However, in the embodiment of FIG. 3, a connector 110' is used in place of connector 110. In connector 110', the conductive post 130 of connector 110 is substantially shortened and a low pass filter 136 is connected to the distal end 132 of conductive post 130. A second conductive post 138 is attached to the distal end of the low pass filter 136 (i.e., the end opposite the post 132) to extend into the internal cavity 166 of the mating connector 150 (part of the low pass filter 136 also extends into the internal cavity 166 of the mating connector 150 in the depicted embodiment). The post 138 may be received within the spring arms 176 of spring contact 170 when connector 110' is mated with connector 150. The low pass filter 136 may comprise, for example, an inductor or some other configuration of circuit elements (e.g., capacitors, inductors and/or resistors) that are configured to form a low pass filter that substantially blocks signals above a first frequency from passing from conductive post 130 to conductive post 138 while allowing signals below a second frequency to pass from conductive post 130 to conductive post 138. The first frequency may be selected to be below the frequency band of the RF signal, and the second frequency may be selected to be above the frequency band of the control signals and/or power signals. Thus, by providing a low pass filter 136 along the direct galvanic connection between connectors 110' and 150, the connector junction 100' of FIG. 3 may provide improved PIM suppression. Moreover, the skin depth effect may also substantially keep the low pass filter 136 out of the RF signal path so that the low pass filter 136 does not cause substantial intermodulation distortion or other negative effects on the RF signal path.

Figure 4:
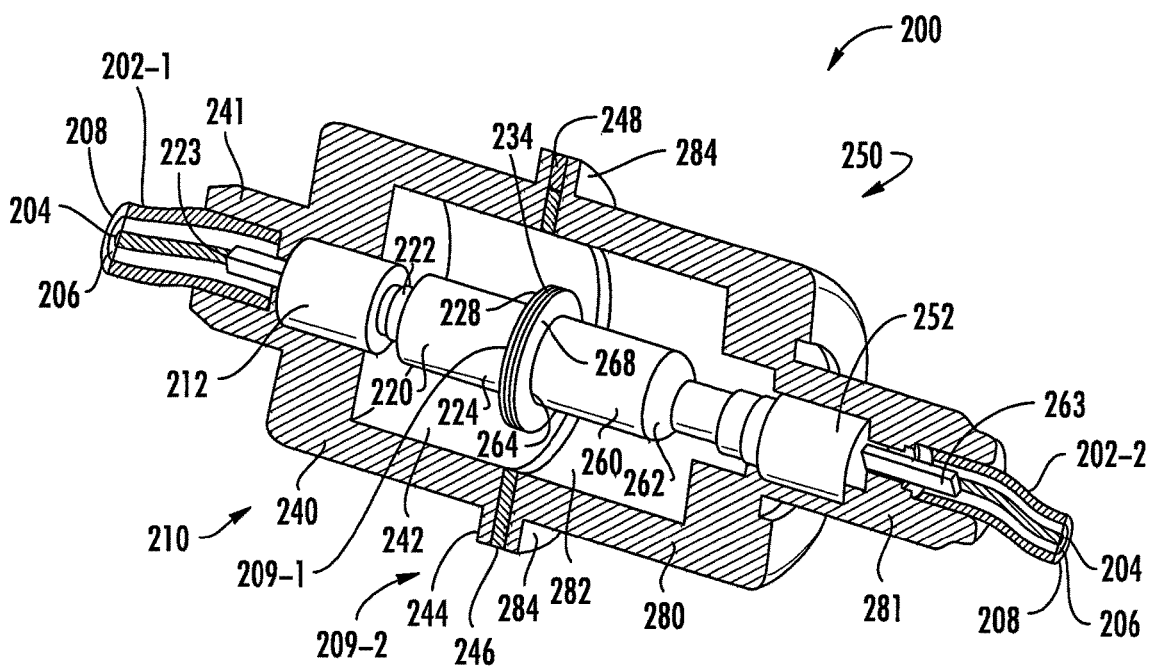
FIG. 4 is a perspective cross-sectional view of a coaxial connector junction according to still further embodiments of the present invention.

While FIGS. 2 and 3 illustrate embodiments in which the connector junction 100, 100' involves a single signal path, more typically an electrical cable will include two conductors and electrical connectors that connect two such cables provide electrical connections for each of these conductors. FIG. 4 is a schematic cross-sectional view of a connector junction 200 in which two coaxial connectors 210, 250 are used to electrically connect a first coaxial cable 202-1 to a second coaxial cable 202-2.

As shown in FIG. 4, the coaxial cables 202 each include a center conductor 204, a dielectric layer 206 that circumferentially overlies the center conductor 204, and an outer conductor 208 that circumferentially overlies the dielectric layer 206. Each coaxial cable 202 will also typically include an outer protective jacket (not shown to simplify the drawing) and may include various tapes or other conventional features known to those of skill in the art.

As is further shown in FIG. 4, a first coaxial connector 210 is mounted on the end of coaxial cable 202-1 and a second coaxial connector 250 is mounted on the end of coaxial cable 202-2. As with the embodiments depicted in FIGS. 2 and 3 above, in FIG. 4 the housings of the first and second coaxial connectors 210, 250 are not shown to simplify the drawings and to more clearly illustrate the design and construction of the signal paths through the coaxial connectors 210, 250. It will be appreciated that any appropriate housing structures may be used and that the housings may include mating attachment structures (e.g., a threaded coupling nut on one housing and a threaded surface on the other housing) that may be used to draw the coaxial connectors 210, 250 into firm electro-mechanical engagement. FIG. 4 is an exploded perspective view of the connectors 210, 250 in their mated condition. Note that in FIG. 4 solder preforms or other structures/materials that may be used to electrically connect the center conductor 204 of each coaxial cable 202 to the center conductor extensions 220, 260 of their associated coaxial connectors 210, 250 and/or to electrically connect the outer conductors 208 of coaxial cables 202 to the outer conductor extensions 240, 280 of their associated coaxial connectors 210, 250 are not shown to simplify the drawings.

The coaxial connector 210 includes a center conductor extension 220, an outer conductor extension 240, and a dielectric spacer 212 that physically separates and electrically isolates the center conductor extension 220 from the outer conductor extension 240. The center conductor extension 220 has the design of the conductor extension 120 of FIG. 3. In particular, the center conductor extension 220 has a first end 222 and a second end 224. The first end 222 includes a boss 223 extending rearwardly therefrom that is used to physically mount the center conductor extension 220 on the center conductor 204 of the first coaxial cable 202-1 and to provide an electrical connection therebetween. The second end 224 of the center conductor extension 220 includes an internal cavity (not visible) that has an open end (see FIGS. 2B-2C and 3). This internal cavity may be identical to the internal cavity 126 of coaxial connector 110 that is described above. The second end 224 of the center conductor extension 220 also includes a lip that forms an annular plate 228. An annular dielectric disk 234 is attached to the annular plate 228.

The coaxial connector 210 further includes a first low pass filter that is connected to the conductor extension 220 via a first conductive post. The first low pass filter includes a second conductive post extending longitudinally from the distal end thereof beyond the internal cavity 226. The low pass filter, first conductive post and second conductive post may be identical to the low pass filter 136, the first conductive post 130 and the second conductive post 138 of coaxial connectors 110, 110' that are described above, and hence they are not pictured separately herein.

The outer conductor extension 240 may have a design that is similar to the inner conductor extension 220, except that the outer conductor extension 240 is designed to circumferentially surround the inner conductor extension 220 and hence has a larger cross-sectional diameter. In particular, the outer conductor extension 240 has a first end that includes a tail 241 that is soldered to the outer conductor 208 of the first coaxial cable 202-1 to physically and electrically connect the outer conductor 208 to the outer conductor extension 240. The second end of the outer conductor extension 240 includes an internal cavity 242 that has an open end. The second end of the outer conductor extension 240 also includes a lip that forms an annular plate 244. An annular dielectric disk 246 may be attached to the annular plate 244.

The center conductor extension 220 is disposed within the internal cavity 242 of the outer conductor extension 240. Additionally, a second low pass filter 248 (illustrated schematically in FIG. 4) is provided that is electrically connected between the outer conductor extension 240 and the outer conductor extension 280 of mating coaxial connector 250, which will be described in further detail below. In the depicted embodiment, the second low pass filter 248 is embedded in the annular dielectric disk 246. The second low pass filter 248 may be positioned near outer edges of the annular plate 244 so as to be outside the RF path (RF energy will flow on the inner surfaces of the outer conductor extensions 240, 280). The second low pass filter 248 may have spring contacts (not shown) on either end thereof to ensure that it makes good electrical contact with the outer conductor extensions 240, 280. While the second low pass filter 248 is positioned in the annular dielectric disk 246 in the depicted embodiment, it will be appreciated that it can be positioned in a variety of other locations in other embodiments. For example, in another example embodiment, a flexible printed circuit board (not shown) that includes the second low pass filter 248 thereon may be rolled into a tube and disposed to circumferentially surround the mated center conductor extensions 220, 260 in place of the galvanically coupled outer conductor communications path that is depicted in FIG. 4. It will be appreciated that numerous other designs are possible.

The coaxial connector 250 may be very similar to the coaxial connector 210. The coaxial connector 250 includes a center conductor extension 260, an outer conductor extension 280, and a dielectric spacer 252 that physically separates and electrically isolates the center conductor extension 260 from the outer conductor extension 280. The center conductor extension 260 has a first end 262 and a second end 264. The first end 262 includes a boss 263 that is used to physically mount the center conductor extension 260 on the center conductor 204 of the second coaxial cable 202-2 and to provide an electrical connection therebetween. The second end 264 of the center conductor extension 260 includes an internal cavity (not visible) that has an open end. This internal cavity may be identical to the internal cavity 126 of coaxial connector 110 that is described above. The second end 264 of the center conductor extension 260 includes an outer lip that forms an annular plate 268.

The center conductor extension 260 further includes a spring contact (not shown) that is positioned within the internal cavity thereof that is mechanically and electrically connected to the center conductor extension 260. The spring contact may be identical to the spring contact 170 that is described above with reference to FIG. 2D. The spring contact is configured to receive the second conductive post of the first low pass filter of coaxial connector 210 when the first coaxial connector 210 is mated with the second coaxial connector 250. The spring contact may be press fit, soldered or welded into a longitudinal hole in the base of the internal cavity 266.

The outer conductor extension 280 has a first end that includes a tail 281 that is soldered to the outer conductor 208 of the second coaxial cable 202-2 to physically and electrically connect the outer conductor 208 to the outer conductor extension 280. The second end of the outer conductor extension 280 includes an internal cavity 282 that has an open end. The second end of the outer conductor extension 280 also includes a lip that forms an annular plate 284. The center conductor extension 260 is disposed within the internal cavity 282 of the outer conductor extension 280.

When coaxial connectors 210 and 250 are mated together, the annular plates 228 and 268 are joined together in facing arrangement with the dielectric spacer 234 therebetween to form a first capacitor 209-1. Likewise, the annular plates 244 and 284 are joined together in facing arrangement with the dielectric spacer 246 therebetween to form a second capacitor 209-2.

The connector junction 200 will thus have a center conductor communications path that electrically connects the center conductor 204 of the first coaxial cable 202-1 to the center conductor 204 of the second coaxial cable 202-2. The connector junction 200 will also have an outer conductor communications path that electrically connects the outer conductor 208 of the first coaxial cable 202-1 to the outer conductor 208 of the second coaxial cable 202-2. The center conductor extension communications path will include a capacitively coupled center conductor communications path that passes through the capacitor 209-1 and a galvanically coupled center conductor communications path that passes through the first low pass filter. The outer conductor extension communications path will include a capacitively coupled outer conductor communications path that passes through the capacitor 209-2 and a galvanically coupled outer conductor communications path that passes through the second low pass filter 248.

The connector junction 200 of FIG. 4 will operate like a conventional capacitively coupled connector junction for RF signals that are present on either cable 202-1 or 202-2, as the skin depth effect and/or the first and second low pass filters will substantially prevent the RF signals from passing through the galvanically coupled center or outer conductor communications paths. Low frequency control signals and/or DC power signals may pass through the mated connector junction 200 via the galvanically coupled center or outer conductor communications paths, but will generally not pass through the capacitively coupled center or outer conductor communications paths as the capacitors 209-1, 209-2 will act as high pass filters that will substantially prevent the low frequency control signals and/or DC power signals from traveling along the capacitively coupled communications paths.

Figure 5:
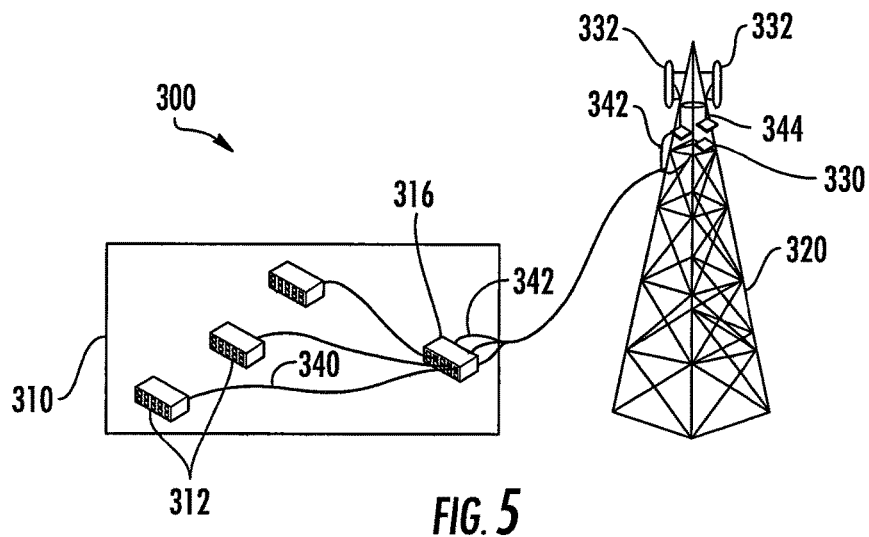
FIG. 5 is a schematic block diagram of a cellular base station that uses coaxial cables connected by coaxial connector junctions according to embodiments of the present invention.

While the coaxial connector junctions according to embodiments of the present invention may be used in many different applications, they may be particularly well-suited for use in cellular base stations. FIG. 5 schematically illustrates a cellular base station 300 in which the coaxial connector junction 200 of FIG. 4 may be used. As shown in FIG. 5, the cellular base station 300 includes an equipment enclosure 310 and a tower 320. Three baseband units 312 and a power supply 316 are located within the equipment enclosure 310. Three remote radio heads 330 and three antennas 332 are located at the top of the tower 320.

Figure 5A:
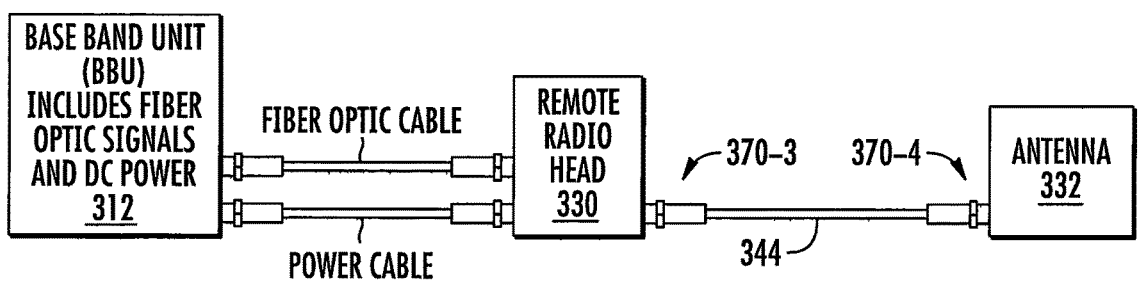
FIG. 5A is a schematic diagram illustrating coaxial connector junctions in a cellular base station that may be implemented using the coaxial connector junctions according to embodiments of the present invention.

As shown in FIG. 5A, the base band unit, or BBU 312, is attached to the remote radio head 330 by a combination of a fiber optic cable and a power cable (or by a hybrid cable which is a single cable with fiber optic and power elements combined into a single unit). This arrangement provides power for the remote radio heads 330 and/or the antennas 332, as well as the signal to be radiated from the antenna and control signals. The remote radio heads 330 are connected to the antennas 332 by coaxial cables 344 that are terminated with coaxial connectors. These coaxial connectors may be connected to mating coaxial connectors on the remote radio heads 330 and antennas 332 to form coaxial connector junctions 370. For example, coaxial connector junctions 370 may be provided at each connection between remote radio heads 330 and each coaxial cable 344 (junctions 370-3) and between each coaxial cable 344 and an antenna 332 (junctions 370). Each coaxial cable junction 370 may be implemented, for example, using the coaxial connector junction 200 of FIG. 4.

Referring again to FIG. 5, the antennas 332 may, for example, include an actuator that moves or electrically adjusts internal elements for purposes of beam steering or may be a gimbaled antenna that is driven by a motor. In either case, control signals may be used to control the antenna 332. Typically, these control signals are generated at the base of the tower 320 (or elsewhere) and must be transmitted up the tower 320 to the antennas 332 to control the antennas 332 Additionally, the remote radio heads 330 and the beam shaping circuit and/or motor on the antennas 332 will require power signals to operate (typically a DC power signal). In conventional cellular base stations, a separate cable is typically routed from the enclosure 310 to the top of the tower 320 and the control signals and power signal are transmitted up the tower 320 over this separate cable. Additional connectors are also typically required at both the top of the tower and the bottom of the tower to connect the power/control signal cable to the equipment at each location. The inclusion of the separate cable and connectors may result in a number of disadvantages, including increased equipment costs, increased wind and weight loading on the tower and increased installation costs.

However, when coaxial connector junctions according to embodiments of the present invention are used the RF signals from the baseband units 312, the DC power signals from the power supply 316 and the control signals from a controller (not shown) may all be transmitted up the tower 320 on the coaxial cables 342, 344, thereby eliminating the need for one or more additional cables.

Figure 6:
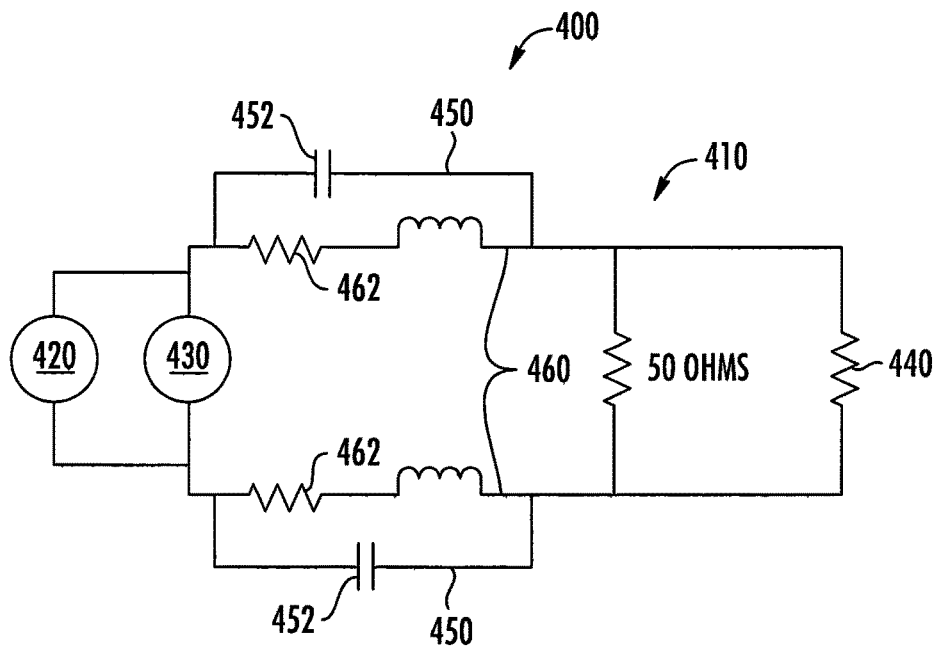
FIG. 6 is a circuit diagram illustrating an electrical circuit formed by coaxial connector junctions according to certain embodiments of the present invention.

FIG. 6 is a circuit diagram of a coaxial connector junction 400 according to embodiments of the present invention. As shown in FIG. 6, a transmission line 410 is provided. In the example of FIG. 6, the transmission line 410 is a 50 ohm transmission line. A first signal source 420 is provided that may be used to inject a low frequency signal onto the transmission line 410. A second signal source 430 is provided that may be used to inject a high frequency RF signal onto the transmission line 410. A load 440 is provided at the end of the transmission line 410.

As shown in FIG. 6, both the first and second signal sources 420, 430 are capacitively coupled to the load 440 through a two-sided capacitively coupled communications path 450 that includes first and second capacitors 452. The first and second signal sources 420, 430 are galvanically coupled to the load 440 through a two-sided communications path 460 that includes a pair of low pass filters 462.

The connector junctions according to embodiments of the present invention such as connector junctions 100, 200, 300, 400 may exhibit a number of advantages. First, as noted above, the connector junctions 100, 200, 300, 400 may be used to pass both high frequency RF signals along with one or more low frequency control and/or power signals. This may reduce the number of cables and connectors that are required in various applications such as the number of cables that must be run up an antenna tower at a cellular base station.

Additionally, one potential problem with conventional capacitively coupled coaxial connector junctions is that the outer conductors of the two connectors that form the junction may not be at the same electrical potential since the outer conductors of the two connectors are not directly electrically connected to each other. If moisture accumulates on the exposed outer surface of the outer conductors of the two connectors it may provide an electrical path between the two outer conductors. If a potential difference exists between the two conductors, it will encourage a flow of electrical ions from the outer conductor extension at the higher potential to the outer conductor extension at the lower potential, which results in galvanic corrosion to the outer conductor extensions. However, since the electrical path through the second low pass filter appears as a direct galvanic connection to low frequency signals, the outer conductor extensions will be maintained at the same potential and the above-described mechanism for corrosion of the outer conductor extensions may be reduced or eliminated.

Figure 7:
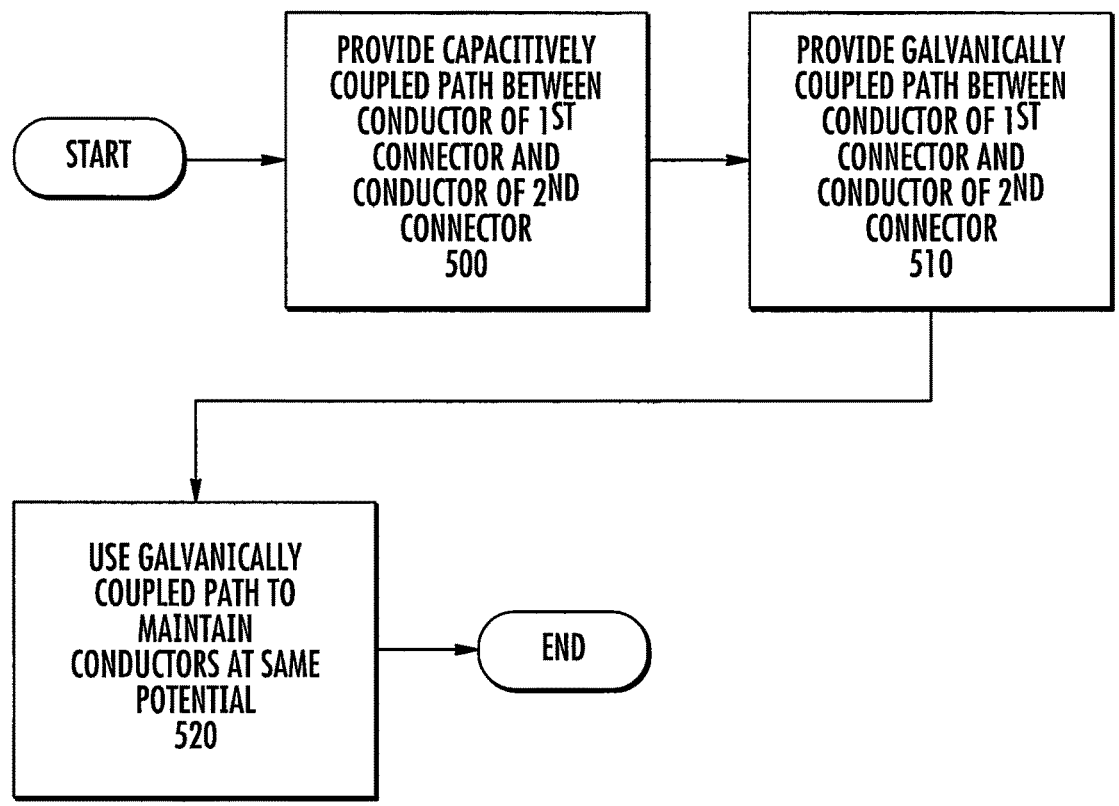
FIG. 7 is a flow chart illustrating a method of preventing corrosion in a connector junction between a first electrical connector and a second electrical connector according to embodiments of the present invention.

FIG. 7 is a flow chart diagram that illustrates a method of reducing corrosion in a connector junction according to certain embodiments of the present invention. As shown in FIG. 7, a first capacitively coupled communications path may be provided between a conductor of a first connector and a conductor of a second connector (block 500). A second galvanically coupled communications path may also be provided between the conductor of the first connector and the conductor of the second connector (block 510). The second galvanically coupled communications path is electrically parallel to the first capacitively coupled communications path and is configured to maintain the conductor of the first connector and the conductor of the second connector at the same electrical potential (block 520).

Moreover, the connector junctions according to embodiments of the present invention may also provide a low frequency ground path that may be used to dissipate lightning strikes that transfer energy to, for example, a coaxial cable that is routed up an antenna tower. When a lightning strike transfers energy to a coaxial cable, this energy tends to be carried by the outer conductor of the coaxial cable. The electrical energy imparted to the outer conductor may have a very high voltage. Accordingly, if this electrical energy passes to equipment that is attached to the coaxial cable it has the potential to damage or destroy such equipment. Typically, small portions of the jacket of a coaxial cable that is routed up an antenna tower will be removed and conductive ground straps are connected between the outer conductor and the tower. As the tower is formed of metal and as the base of the tower is grounded, the conductive straps provide low resistance ground paths that may be used to pass the electrical energy of a lightning strike to ground.

Typically, the electrical energy of a lightning strike appears as a low frequency signal. When capacitively-coupled connector junctions are used (to reduce PIM), the capacitive connection between the outer conductor extensions of two mated connectors tends to block the energy of the lightning strike. As such, it may be necessary to ground each and every cable segment between the enclosure and the equipment at the top of the tower. This may be difficult and/or inconvenient to do with respect to cable segments at the top of the antenna tower. However, when the connector junctions according to embodiments of the present invention are used, the second galvanically coupled outer conductor communications path may be used as a conductive path for carrying energy of the lightning strike to a ground strap to dissipate the energy of a lightning strike.

The connectors according to certain embodiments of the present invention may include a both a first capacitively coupled signal path that be used to pass high frequency signals to a mating connector as well as a second galvanically coupled communications path. The connectors are designed so that they can be connected and disconnected from other mating connectors while still providing these parallel paths.

It will be appreciated that numerous modifications may be made to the example embodiments that are discussed above without departing from the scope of the present invention. For example, in the embodiments discussed above, the annular dielectric disks that form the dielectric of the various capacitors are mounted on the conductor extensions of the connector that includes the low pass filters. In other embodiments, any other appropriate arrangement may be used, such as mounting these disks on the connectors that include the spring contact structures or on both of the connectors of a connector junction. It will also be appreciated that the low pass filters may be included in either or both connectors of a connector junctions. As another example, the plate capacitor arrangement illustrated in the connectors of FIGS. 2-4 may be replaced with other capacitor designs. Moreover, the galvanic connection between the two outer conductor extensions of a mated connector junction may be outside the outer conductor extensions. Such a design may require a better low pass filter, as it may not use the skin depth effect to provide isolation between the capacitive and galvanic signal paths. In some embodiments, some or all of the internal cavities provided on the connectors may be omitted.

While the present invention has been described above primarily with reference to the accompanying drawings, it will be appreciated that the invention is not limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including" when used in this specification, specify the presence of stated features, operations, elements, and/or components, but do not preclude the presence or addition of one or more other features, operations, elements, components, and/or groups thereof.

Herein, the terms "attached", "connected", "interconnected", "contacting", "mounted" and the like can mean either direct or indirect attachment or contact between elements, unless stated otherwise.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A coaxial connector junction, comprising:
   a first coaxial connector that includes a first center conductor extension and a first outer conductor extension; and
   a second coaxial connector that is mated with the first coaxial connector, the second coaxial connector including a second center conductor extension and a second outer conductor extension; and
   wherein a communications path between the first outer conductor extension and the second outer conductor extension includes a first capacitively coupled outer conductor communications path and a second galvanically coupled outer conductor communications path.

2. The coaxial connector junction of claim 1, wherein the first capacitively coupled outer conductor communications path is configured to substantially pass signals having frequencies in a first frequency range while substantially blocking signals having frequencies in a second frequency range that encompasses frequencies that are lower than the first frequency range, and wherein the second galvanically coupled outer conductor communications path is configured to substantially pass signals having frequencies in the second frequency range while substantially blocking signals in the first frequency range.

3. The coaxial connector junction of claim 1, wherein a communications path between the first center conductor extension and the second center conductor extension includes a first capacitively coupled center conductor communications path and a second galvanically coupled center conductor communications path.

4. The coaxial connector junction of claim 3, wherein the first capacitively coupled center conductor communications path is configured to substantially pass signals having frequencies in a first frequency range while substantially blocking signals having frequencies in a second frequency range that encompasses frequencies that are lower than the first frequency range, and wherein the second galvanically coupled center conductor communications path is configured to substantially pass signals having frequencies in the second frequency range while substantially blocking signals in the first frequency range.

5. The coaxial connector junction of claim 3, wherein the first center conductor extension includes an outer shell that defines an internal cavity, and wherein the first capacitively coupled center conductor communications path extends along the outer shell and the second galvanically coupled center conductor communications path extends through the internal cavity.

6. The coaxial connector junction of claim 5, wherein the second galvanically coupled center conductor communications path includes an inductance that is at least partly within the internal cavity.

7. The coaxial connector junction of claim 1, wherein the first outer conductor extension includes an outer shell that defines an internal cavity, and wherein the first capacitively coupled outer conductor communications path extends along the outer shell and the second galvanically coupled outer conductor communications path extends through the internal cavity.

8. The coaxial connector junction of claim 7, wherein the second galvanically coupled outer conductor communications path includes an inductance.

9. The coaxial connector junction of claim 1, wherein the first outer conductor extension is spaced apart from and circumferentially surrounding the first center conductor extension and the second outer conductor extension is spaced apart from and circumferentially surrounding the second center conductor extension.

10. The coaxial connector junction of claim 1, wherein the first capacitively coupled outer conductor communications path and the second galvanically coupled outer conductor communications path comprise parallel paths that are configured to carry signals in different frequency ranges.

11. A coaxial connector comprising:
a center conductor extension that has an outer shell that defines an internal cavity and a center conductor contact that is electrically connected to the center conductor extension and disposed within the internal cavity;
an outer conductor extension that is spaced apart from and circumferentially surrounding the center conductor extension; and
a dielectric spacer interposed between the center conductor extension and the outer conductor extension that electrically isolates the center conductor extension from the outer conductor extension.

12. The coaxial connector of claim 11, wherein the center conductor contact is configured to mate with a center conductor contact of a mating coaxial connector.

13. The coaxial connector of claim 11, wherein the center conductor contact includes a low pass filter.

14. The coaxial connector of claim 11, further comprising a coupling nut that is configured to releasably attach the coaxial connector to a mating coaxial connector so that the center conductor extension capacitively couples with a center conductor extension of the mating coaxial connector and the outer conductor extension capacitively couples with an outer conductor extension of the mating coaxial connector, and so that the center conductor contact galvanically mates with a mating center conductor contact of the mating coaxial connector.

15. The coaxial connector of claim 14, wherein the center conductor extension of the mating coaxial connector comprises an outer shell that defines an internal cavity, and wherein the mating center conductor contact of the mating coaxial connector is electrically connected to the center conductor extension of the mating coaxial connector.

16. An electrical connector, comprising:
an outer conductor extension having a cable receiving end and a connection end opposite the cable receiving end;
a center conductor extension having a first end that is configured to physically and electrically engage a conductor of a communications cable that is received within the cable receiving end of the outer conductor extension and a second end that comprises an outer shell that defines an internal cavity; and
a center conductor contact that is within the internal cavity,
wherein the outer conductor extension is spaced apart from and circumferentially surrounds at least a portion of the center conductor extension including the outer shell thereof.

17. The electrical connector of claim 16, wherein the outer shell is configured to capacitively couple with a center conductor extension of a mating electrical connector, and wherein the center conductor contact is configured to physically engage a center conductor contact of the mating coaxial connector to provide parallel communications paths between the electrical connector and the mating electrical connector.

18. The electrical connector of claim 17, wherein the center conductor contact includes a low pass filter.

19. The electrical connector of claim 16, wherein the outer shell includes an expanded capacitive coupling surface.

* * * * *